(12) United States Patent
Gentilini et al.

(10) Patent No.: US 12,098,032 B2
(45) Date of Patent: Sep. 24, 2024

(54) SMART WAREHOUSE, CONVEYOR, AND PALLET MANAGEMENT SYSTEM

(71) Applicant: Datalogic USA Inc., Eugene, OR (US)

(72) Inventors: Luca Gentilini, Ravenna (IT); Luca Rocchini, Turate (IT); Luigi Pellegrino, Bologna (IT); Craig Cherry, Eugene, OR (US); Kevin Landman, Eugene, OR (US); Pietro Todescato, Eugene, OR (US); Nick N Tabet, Eugene, OR (US); WenLiang Gao, Eugene, OR (US); Steven Gutke, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 732 days.

(21) Appl. No.: 17/415,656

(22) PCT Filed: Dec. 27, 2019

(86) PCT No.: PCT/US2019/068784
§ 371 (c)(1),
(2) Date: Jun. 17, 2021

(87) PCT Pub. No.: WO2020/142385
PCT Pub. Date: Jul. 9, 2020

(65) Prior Publication Data
US 2022/0073280 A1    Mar. 10, 2022

Related U.S. Application Data

(60) Provisional application No. 62/786,815, filed on Dec. 31, 2018.

(51) Int. Cl.
*B65G 1/137* (2006.01)
*B65G 57/00* (2006.01)

(52) U.S. Cl.
CPC .......... *B65G 1/1375* (2013.01); *B65G 57/00* (2013.01); *B65G 2201/0267* (2013.01)

(58) Field of Classification Search
CPC ................. B65G 1/1375; B65G 57/00; B65G 2201/0267
See application file for complete search history.

(56) References Cited

U.S. PATENT DOCUMENTS

2017/0161663 A1* 6/2017 Miele ............... G06Q 10/06315
2019/0193956 A1* 6/2019 Morland ................ B65G 57/03

* cited by examiner

*Primary Examiner* — Kyle O Logan
(74) *Attorney, Agent, or Firm* — Datalogic USA, Inc.

(57) ABSTRACT

A system and computer-implemented method for pallet management and constructing a pallet stack may include generating a virtual pallet stack using virtual packages having sizes and shapes corresponding with known available actual packages. In response to identifying an actual package to be placed on a pallet, an indication may be provided to a worker where the identified actual package is to be placed on the pallet stack based on the location of a corresponding virtual package on the virtual pallet stack.

20 Claims, 5 Drawing Sheets

SMART WAREHOUSE, CONVEYOR, AND PALLET MANAGEMENT SYSTEM

CROSS REFERENCE TO RELATED APPLICATION

This application is a U.S. National Stage application of International Application No. PCT/US2019/0068784, filed Dec. 27, 2019, which claims the benefit of U.S. Provisional Application No. 62/786,815, filed Dec. 31, 2018, and entitled "Smart Warehouse, Conveyer, and Pallet Management System," the disclosures of which are is hereby incorporated in their its entirety by this reference.

TECHNICAL FIELD

The present disclosure relates to the real-time identification of items in a confined area, or more particularly, to an intelligent system for a warehouse, conveyor, and pallet management logistics.

BACKGROUND

Online shopping has exploded over the past 20 years. Mass consumer goods sales sites of online retailers originally distributed a limited selection of products. However, as those sites have grown to become mass merchants, the ability to fulfill orders has become a significant issue for the online retailers. To compete with traditional brick-and-mortar retailers, online retailers have to provide same day delivery or even delivery within a few hours. Such time constraints places a significant burden on the online retailers for accessing the ordered products and shipping those products to the correct destination within the needed timeframe without making mistakes in that process. As it appears that online shopping will continue to grow for the foreseeable future and delivery times continue to be reduced, logistics of handling and shipping the products will become a larger challenge. To handle such expected product distribution increases, online retailers are developing warehousing and delivery processes that include the use of bulk containers, such as pallets or other shipping structures (e.g., roll-containers, racks, and so on), to move the products from warehouse(s) towards final destinations.

Currently, products that are to fulfill online orders are selected at a warehouse, placed on a conveyor system, and manually carried from the conveyor system to a container (e.g., pallet, roll-container, or other bulk shipping structure, as understood in the art). For the purposes of this disclosure, the term "pallet" refers to any structure for shipping products in bulk.

The process of hand-carrying the products from the conveyor system to a container that is destined for a destination for the product can be a challenge over time for workers or operators. Human factors often play a part of errors that are made when operators or workers handle the physical transfer from the conveyor system to a correct container destined for a particular geography. Such human factors may include, but are not limited to, long shifts during which the workers are challenged to move quickly in a confined space. Over time, accuracy of physically moving the products to the correct container tends to drop, even for the best operators.

The processes of determining which packages are to be moved to which pallets may be time consuming or inefficient for workers. The process of constructing pallets may be logistically challenging and time intensive. The ability to ensure integrity of packages, such as packages that are damage that could be biohazardous, has become a significant issue when handling products that, if damages, could result in harm to workers. Constructing structurally sound pallets can be a challenge, and poorly constructed pallets may be dangerous for workers and goods contained in the packages. With the speed at which works have to handle the packages, it is not uncommon for workers to misplace foreign objects, such as scissors, knives, tape dispensers, or other tools that are used within warehouses. Hence, the inventors have identified a need to address these and other logistical challenges that are faced within warehouses.

BRIEF SUMMARY

An improvement in logistics when physically moving products from conveyer (or other) systems to pallets may include the use of an overhead imaging system that is capable of reading an identifier, such as a represented by a machine-readable indicia (e.g., barcodes, QR codes, or other codes) that include or are indicative of a destination identifier, product identifier, or otherwise. The overhead imaging system may include one or more 2D cameras that may capture images of packages that are being moved and/or placed on the pallets. The cameras or processing unit(s) in communication with the cameras may process the images, read or determine the identifier, and provide guidance and/or other sensory feedback signal (e.g., visual, audible, and/or tactile) to an operator who is moving or has moved a package to a pallet. The sensory feedback may provide verification for the operators to help ensure that the packages that are moved to pallets are moved from the conveyer system to the correct pallets (i.e., a pallet that is being shipped to a destination on the way to a final destination of the package).

As provided herein, a number of logistical problems are being addressed, including moving packages from the conveyer system to the pallets, associating operators with packages, detecting package integrity, providing pallet construction guidance, detecting foreign objects on packages, providing light indicators for additional guidance to operators, supporting conflict resolution between neighboring cells, which may include electronics (e.g., cameras, lighting, processor(s)) used to monitor and guide workers and/or packages, at which pallets are being constructed, reducing cost of camera monitoring systems, and provide lighting and camera support that may help with logistical operations within a busy warehouse. As provided herein, an intelligence system that may be formed of hardware and logical modules to support operations within a warehouse that result in more efficient, more accurate, and safer operations.

One embodiment of a system and computer-implemented method for constructing a pallet stack may include generating a virtual pallet stack using virtual packages having sizes and shapes corresponding with known available actual packages. In response to identifying an actual package to be placed on a pallet, an indication may be provided to a worker where the identified actual package is to be placed on the pallet stack based on the location of a corresponding virtual package on the virtual pallet stack.

BRIEF DESCRIPTION OF THE DRAWINGS

Illustrative embodiments of the present disclosure are described in detail below with reference to the attached drawing figures, which are incorporated by reference herein and wherein.

DETAILED DESCRIPTION

Figure 1:
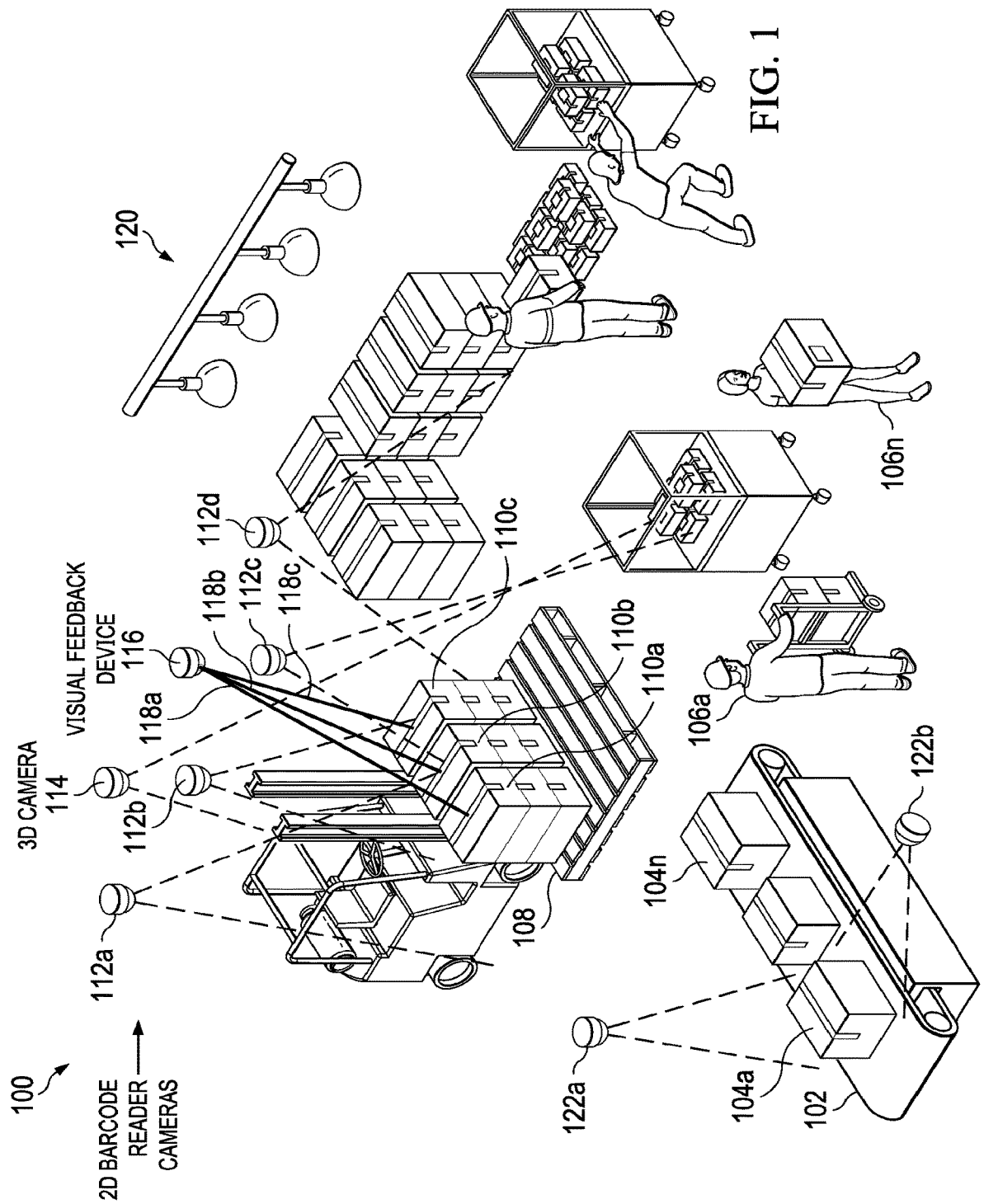
FIG. 1 is an illustration of an illustrative package processing environment, including a conveyer system that moves packages (e.g., boxes, items, parcels, etc.) for workers or operators to physically move those packages to a pallet of a number of pallets (other pallets not shown) during a fine sorting process of the packages.

With regard to FIG. 1, an illustration of an illustrative package processing environment 100, including a conveyer system 102 that moves packages (e.g., boxes, items, parcels, etc.) 104a-104n (collectively 104) for workers or operators 106a-106n (collectively 106) to physically move those packages 104 to a pallet 108 of a number of pallets (other pallets not shown) during a fine sorting process of the packages 104 is shown. Illustrative overhead code readers or cameras 112a-112d (collectively 112) may be used to improve accuracy of placing the packages 104 on a correct pallet 108, for example, for further distribution of the packages. It should be understood that the cameras 112 shown are for illustration purposes only, and that any configuration of camera may be utilized (e.g., non-domed cameras). Moreover, any number of cameras may be utilized to perform the same or equivalent function. The overhead cameras 112 may be part of a reading system in which barcode reading cameras 112 may be two-dimensional (2D) cameras capable of reading an identifier, such as a machine-readable indicia, such as 1D or 2D codes, due to having sufficient resolution and optionally machine-readable indicia (e.g., barcode) reading functionality.

In an embodiment, a three-dimensional (3D) camera 114 capable of performing 3D measurements may be disposed over a pallet 108 to enable a tracking system to determine that a change in height of packages on the pallet 108 has occurred so that an identifier on the package 110a, for example, may be read. Thereafter, a determination may be made that the package 110a is on the correct pallet 108 for further distribution. In an embodiment, the cameras 112 may be maintained in an OFF state, and in response to the 3D camera determining that a package 110a has been added to the pallet 108, a system may trigger the barcode reader cameras 112 to turn to an ON state and/or read an identifier on the package 110a, as further described herein.

Figure 5:
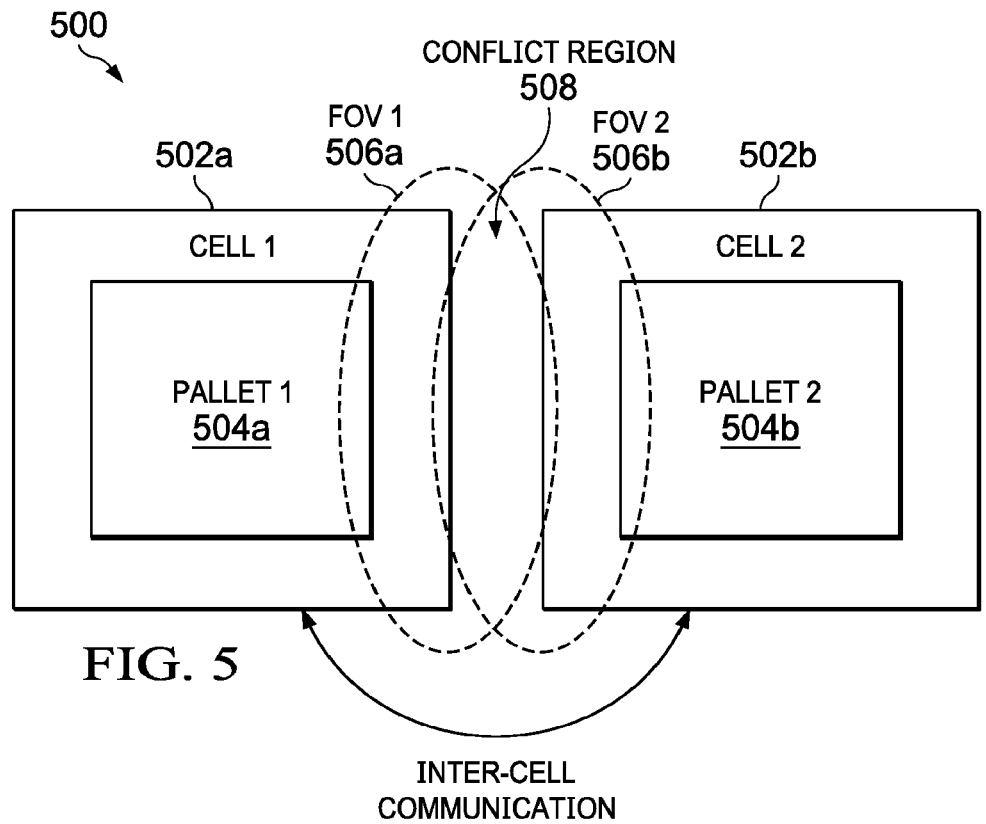
FIG. 5 is an illustration of an environment in which a pair of cells are adjacent to one another.

The system 100 may be configured with a controller (see FIG. 5, for example). The controller may be a separate device or one of the cameras 112. In the second scenario, if the controller stops working (e.g., due to an hardware failure), another camera may automatically replace the non-functioning controller, thereby providing redundancy. The cameras 112 may be configured to acquire and decode an image every time a trigger from the controller is received (sent via TCP connection, for example). The cameras 112 may decode the identifier or ID codes (e.g., machine-readable indicia) in the image, and send to the controller the information of each decoded identifier. The information may be encoded data and the coordinates, in pixels, of the corners of code bounding box or other delimiter. Those information, which may include both data encoded into the identifier and data related to the position of the identifier inside the image that are the coordinates of the four corners of the identifier, may be sent to the controller via TCP in JSON format, for example. The controller may be configured to trigger each of the connected cameras 112, wait for the decoding results, and elaborate the data.

A visual feedback device 116 may be configured to output real-time illumination feedback signals 118a-118c (collectively 118) having different colors, such as red, yellow, and green. The visual feedback device 116 may include a steering mirror (not shown) or other electromechanical device that may be configured to cause the illumination feedback signals 118 to be illuminated onto the packages 110 that were placed on the pallets at the time of placement. In an embodiment, if the placement of the package 110b is correct, then a green (good) illumination feedback signal 118b may be generated; if the placement of the package 110c is incorrect, then a red (bad) illumination feedback signal 118c may be imaged onto the package 110c; if the placement of the package 110a is indeterminable due to the machine-readable indicia not facing the cameras 112, being damaged, or otherwise not being readable, then a yellow (indeterminable or inconclusive) illumination feedback signals 118 may be imaged onto the package 110a. The illumination feedback signal 118 may be generated, for example, by a multi-color LED or laser source, and the illumination feedback signals 118 may be in the form of a shape (e.g., circle), and may be projected onto a package or elsewhere visible to the worker 106a. In an embodiment, the illumination feedbacks signal 118 may be also a sequence of alphanumeric characters (e.g., made by using an actuated mirror to move any of the illumination feedback signals 118). For example, a projected number may be counts of right/wrong/unknown packages moved from the conveyor system 102 to pallets associated to a worker 106a, thereby providing visual feedback for the worker 106a. The counts may indicate that the worker needs a break. The feedback signals 118 may also be indicative of a number of packages that the worker 106a carried the last time he or she entered the pallet area. For instance, if the worker 106a sees just a green "2" projected, while he has carried three packages, the worker 106a may be alerted that the third package has not been seen by the overhead camera system. This is helpful when a steering mirror is not used and it is not possible to projects spots onto each single package; it is possible to project just a colored alphanumeric feedback close to the worker 106a.

In the event that the worker 106a be presented with a yellow (or other color) feedback indicator to indicate that the system is unable to read an identifier, then the worker may simply face identifier on the package toward the cameras 112, replace a damaged identifier, or otherwise have a supervisor assist with the situation.

Alternative real-time feedback techniques may be utilized in response to determining that the package placed on the pallet 108 is correct, incorrect, or inconclusive. For example, an electronic display positioned proximate the pallet 108 may display a color. Alternatively, a wearable device, such as a watch, eyewear (e.g., virtual glasses), and/or headset with a visual projection device, may be configured to display a color and/or alphanumeric sequence to indicate correctness of the placement of the packages 104 on pallets. Other real-time feedback mechanisms, such as audible (e.g., beeps, voice commands, etc.) and/or tactile (e.g., vibration) may provide for real-time feedback to the workers 106 using wearable or other devices. Because the overhead sensor system may be continuously operating, the workers 106 may simply be able to move the packages 104 without having to stop and perform barcode scanning, as has to be performed using conventional processes, thereby improving efficiency of the logistics.

Overhead cameras provide for unobstructively monitoring hand-carried packages from the conveyor system 102 to the pallets during a sorting process. In an embodiment, the sensor solution may be mounted above each pallet and continuously scan the designated pallet area for new pallets and new packages 104 being placed upon the pallet 108, for example. In an embodiment, the cameras 112, 114, and visual feedback device 116 may be fixedly positioned on or suspended from a ceiling or support structure (e.g., ceiling beam). Alternatively, the cameras 112, 114, and visual feedback device 116 may be positioned on a temporary, portable, and/or dynamically movable structure that is moved above pallets that are actively being populated with packages 104, thereby potentially reducing fixture, system, and operational costs.

As shown, the cameras 112a and 112b are positioned at different heights. The reason for having the cameras at different heights is so that the fields-of-view (FOVs) of the cameras 112a and 112b overlap and depths-of-field (DOF) of the cameras 112a and 112b can be different, thereby providing for different resolution and coverage for monitoring the workers 106 independent of the packages 110, packages 110 being placed on the pallets 108, the pallets 108 themselves, workers 106 carrying packages 110, and any other people or objects that the 2D cameras can be used to monitor in the confined work area within the fields-of-view and depths-of-field of the cameras 112a and 112b. It should be understood that more than two cameras may have overlapping fields-of-view (e.g., all four cameras 112 may have overlapping FoVs). In an embodiment, the cameras 112 may having different FoVs and different depths-of-field (e.g., two have the same depths-of-field and two have different depths-of-field), thereby providing for different reading abilities. The FoVs may be overlapping in an embodiment so that the packages 110 may be tracked more easily as they pass through the different FoVs of the cameras 112. The cameras 112c and 112d may be used for the same purposes as the cameras 112a and 112b, and may provide for redundancy.

At longer reading distances (i.e., lower code heights), a single code reader is able to cover the whole pallet area, so the reading redundancy is much higher in the middle height range, where the reading volumes of the four cameras 202 are maximally overlapped. For example, the cameras 112 may be used to monitor multiple workers 106 and multiple packages 110 at the same time. The cameras 112 may have the same or different resolution, such as 2 megapixel cameras.

Although four cameras 112 are shown in FIG. 1, it should be understood that as many cameras as desired may be utilized or needed depending on a configuration of a working area in which packages 104 are being delivered to be placed on pallets 108. Furthermore, although the cameras 112 are shown to be limited to be over the pallets 108, it should be understood that additional cameras may be disposed over other pathways between the conveyor system 102 and pallets 108, and may be utilized to track the workers 106 and packages 104 being carried thereby to be placed on the pallets 108. Such worker tracking may be used to monitor efficiency, provide for corrective guidance should the worker be taking a package to an incorrect pallet, or otherwise. In an embodiment, each of the workers 106 may have an operator identifier that may be read by the cameras 112. The identifiers may be in any format, and be machine readable. The identifiers may be in visible or non-visible inks (if the cameras are capable of reading non-visible inks, for example). RFID tags may also be possible as identifiers such that RFID sensors (not shown) are able to track the workers 106. In one embodiment, the cameras 112 may be compatible with power-over-Ethernet (PoE) 802.3at Type 2, and be compatible with a OC to +60 C operating temperature range. The cameras 112 may further be sealed to IP65 and IP67 ratings.

In an alternative embodiment, rather than using more cameras, a single camera with high resolution (e.g., 12 megapixels) with a vision processor may be utilized. One downside to using fewer cameras is that it is possible for packages to block direct line-of-sight to other packages.

In addition to the real-time feedback being helpful to significantly reduce placement errors, data associated with the real-time feedback may additionally be helpful in monitoring processes, efficiency, alertness, and other statistically useful information for the workers, management, engineers, and/or others. Moreover, alerts may be established to create an alert-type notification in the event that regular or certain types of packages (e.g., mature, hazardous, etc.) are delivered to the wrong location, are dropped, are poorly placed on the pallet, are placed too close to other packages that could be potentially problematic (e.g., chemicals place too close to one another), and so on. The alerts may cause the visual feedback device 116 to generate a different illumination color (e.g., blue), generate a flashing illumination (e.g., flashing red), generate a writing (e.g., write a warning or hazard symbol and/or alphanumeric characters), generate an audio alert signal, and/or generate an alert tactile signal (e.g., different vibration). As another example, if too many packages are being placed together (e.g., more than 100 packages on a single pallet) or the packages are being placed too high on the pallet (e.g., greater than 6 or 8 feet), then a warning or alert signal may be generated.

In an embodiment, one or more of the cameras 112 may have an ambient light sensor that is capable of sensing ambient light in the workspace in which the pallets are located. Based on the amount of ambient light, if the light is too low, then additional lighting may be produced by an external illuminator, such as overhead or directed lighting 120 so that the cameras are capable of reading (e.g., using image processing, such as optical character recognition or barcode reading algorithms, or any other machine vision processing) identifiers (e.g., text, barcodes, QR codes, markings, shapes, etc.) on the packages 104 as the packages 104 are being moved through the work area to the pallets 108. As an alternative, a light sensor output can be used to tune/optimize camera software parameters, such as image sensor exposure time or gain to enable the cameras 112 to operate in lower ambient lighting conditions. In an embodiment, ambient light threshold may be set at 350 lux (lumens per square meter). Depending on the configuration of the cameras 112, no additional illumination is needed when the ambient light is above the ambient light thresholds, and additional illumination may be applied when the ambient light is below the ambient light threshold. In an embodiment, the ambient light may be supplemented with an illuminator that is acceptable to workers (e.g., light that is not continuously increased and decreased, but rather is imperceptible or mildly perceptible). In an embodiment, different color light may be utilized that does not negatively impact a worker, such as a soft blue light.

The conveyer system 102 is shown to include a pair of cameras 122a and 122b (collectively 122) to capture images of the new packages 104 as the packages 104 are being carried on the conveyer system 102. It should be understood that other cameras 122 are illustrative and that a wide range of cameras and camera angles may be utilized to capture identifier(s) disposed on the packages 104. The cameras or imagers 122 may include the ability to capture machine-readable identifiers disposed on any surface of the packages 104. In addition, the cameras may be configured to perform image identification, such as identifying the packages 104 based on other indicia, such as printed images, disposed on the packages, shapes of the packages, or otherwise.

As previously described the camera position is not limited to overhead only. In certain warehouse areas, for example, additional cameras may be positioned around the conveyor system 102, including bottom and/or side cameras. The multi-side reading may also increase operator efficiency as a need to turn packages to having the machine-readable indicia may be reduced or eliminated. In an embodiment, a camera tunnel including ten or more cameras may be utilized to ensure that a machine-readable indicia of each package is read, and speed of movement of the conveyer system 102 may be increased as a result of having sufficient camera coverage.

On the conveyor side of the conveyer system, close to the bottom-reading cameras, NFC readers able to identify operators wearing NFC tags may be utilized. In this way, the worker may be associated with the picked and scanned package more easily. That is, the workers 106 may wear NFC tags, and when a worker picks up one of the packages 104, the system may associate the individual worker with the package that he or she picks up.

Managing Operators and Packages

Once the cameras 122 have identified the packages 104 along the conveyer system 102, a management system (not shown) may perform one or more of the following:

(i) Instruct the workers 106 to take certain actions with the packages 104 while on the conveyor system 102, including but not limited to, an order in which packages 104 are to be removed from the conveyor system 102, instruct the operators where to take the packages 104, which pallet to use, etc.

(ii) Associate operators with respective packages 104. As the workers 106 move around the floor to pick up and move the packages 104 and place them on the pallets 108, the overhead camera(s) 122 may be configured to track movement of workers 106 with the packages 104 and associate the two with each other to further assist in the process of monitoring location of the packages 104 to help ensure each arrives at the designated pallet. Knowing which of the workers 106 has which of the package 104 may help direct instructions and/or notifications directly to the worker so as to provide efficiencies (e.g., via smart glasses or to a display screen that highlights that worker's name to get his or her attention as to where he or she should take the package (e.g., deliver to a particular pallet) or what he or she should do with that package (e.g., bring to a disposal area).

The location/identity of the worker may be determined based on a variety of different techniques, including (i) an RF beacon to a device carried by each of the workers 106, (ii) triangulation, (iii) facial or other biometric recognition, (iv) indicia on a uniform or hat of the worker, (v) thermal camera that tracks workers 106, etc. Moreover, a 3D camera may be used to distinguish between the packages 104 and workers 106. Data representative of each of the workers 106 associated with the packages 104 may be used to provide logistic intelligence so that end-to-end knowledge of the packages 104 and who had contact therewith may be available. Moreover, real-time knowledge of location and step in the logistics process may also be available.

Detecting Package Integrity

Because it is possible for products in the packages 104 to become damaged as a result of falling, being incorrectly rotated, being over-accelerated, being placed under a heavy object (e.g., one or more other packages), the ability to identify situations that caused or may cause a package to be damaged or otherwise lose integrity may help workers 106 to better protect any package that could be compromised. In the event of a package and contents thereof lose integrity, it is possible for the package to smoke and/or catch fire as a result of hazardous materials, batteries, or otherwise becoming damaged.

To help with such a compromising situation, the camera system 112 and/or computing system in communication therewith may be configured to identify damaged packages and provide instructions to the workers 106 to inspect the packages. The camera system may be configured to use machine vision to detect smoke, identify unusual heat (e.g., using an IR sensor), fast downward vertical motion, or any other motion or situation that is possible to identify using the camera system 112, sensors, or otherwise.

In the event of identifying a situation that is actual damage of the package or could have resulted to cause damage to the contents thereof, the instructions may vary depending on the extent of the damage identified as well as the known contents of the package. Examples may include inspection, repackaging, continue, stop, etc. In an embodiment, in the event of detecting smoke or flame, the message may be broadcast to each of the workers 106 who are local to the package, within a certain area of a facility, or throughout the entire facility depending on the nature of the contents of the package and/or situation determined (e.g., fire may be broadcast to all workers 106 in the facility, whereas smoke may be broadcast to workers within a local area of the package identified as potentially being compromised).

Virtual Pallet Construction

Creating pallets can be somewhat challenging depending on the sizes and shapes of the packages that may be available at any given time. Because pallet construction is to be performed carefully, workers 106 who are responsible for constructing the pallets often face challenges when high volume situations occur. To assist the workers 106 with pallet construction, information from the conveyer system 102 may be integrated with logistics information being managed and provided to the workers 106 by constructing a virtual pallet, as described with regard to FIG. 2.

Figure 2:
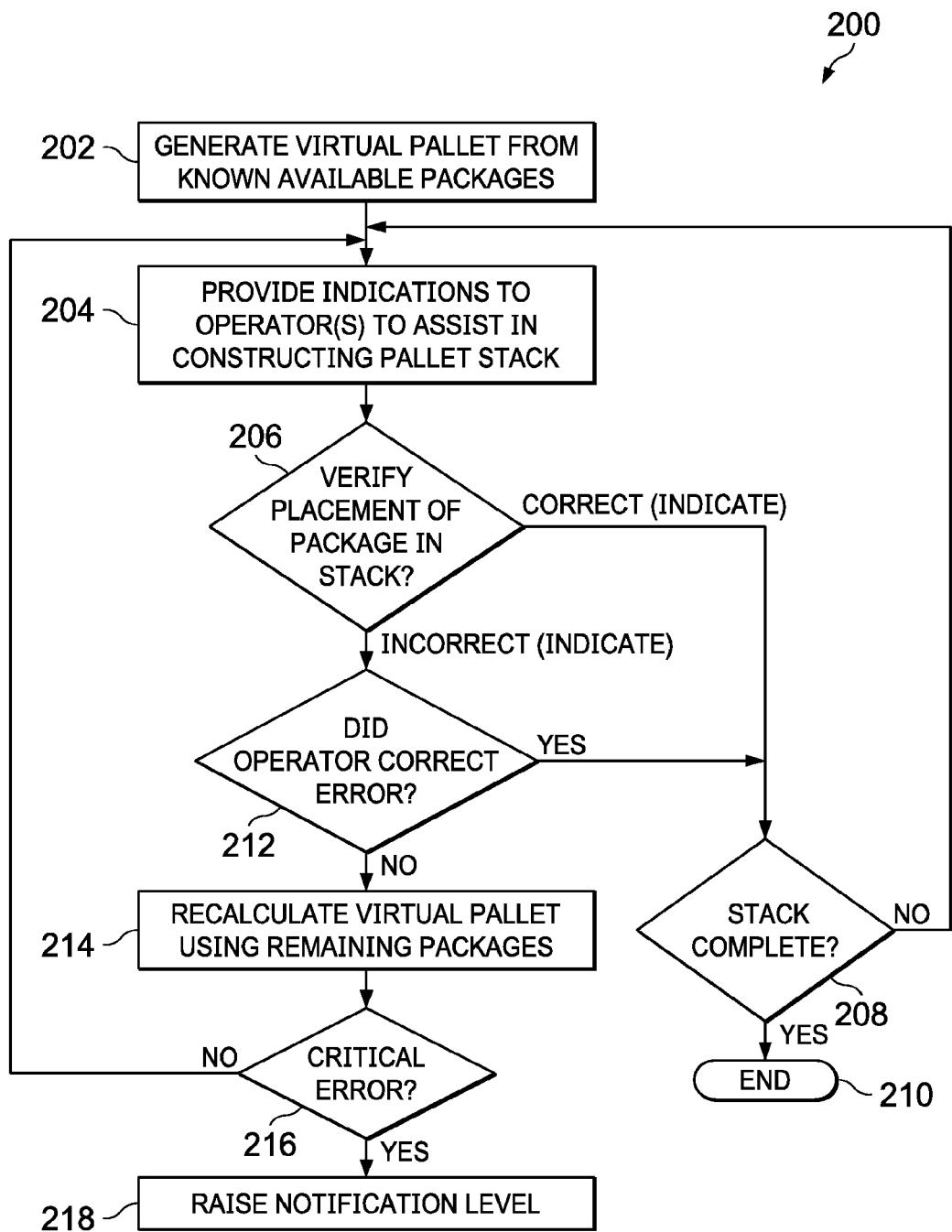
FIG. 2 is a flow diagram of an illustrative process for constructing a virtual pallet and building an actual stack of packages on the pallet, which may also be referred to herein as pallet, based on the virtual pallet.

With regard to FIG. 2, a flow diagram of an illustrative process 200 for constructing a virtual pallet and building an actual stack of packages on the pallet, which may also be referred to herein as pallet, based on the virtual pallet is shown. The process may start at step 202, where a virtual pallet may be generated from known available packages.

The virtual pallet may be created by software being executed by a processor of a computer system that is local to or remote from the pallet to be created based on the packages that are imaged by cameras at the conveyor system or elsewhere (e.g., being carried by a worker). In an embodiment, the cameras may read a machine-readable indicia of one or more packages to be placed on a pallet, determine a size of each package associated with the respective machine-readable indicia (e.g., stored on a database), and use that sizing information to construct a virtual pallet. In constructing the virtual pallet, in addition to the sizing information, weight, content, density, or other information may be utilized, as well according to rules applied to the construction of the pallet and organization of the packages. In constructing the virtual pallet, the software may be configured to create a virtual box or volume with virtual packages representative of actual packages currently available on the conveyor or having recently been removed from the conveyor, but not yet added to the pallet.

In an embodiment, the cameras may be used to measure size of the packages in real-time, and virtual packages that match the measured packages may be created and automatically assembled using a pallet stacking optimization system. In addition to measuring size, weight may also be measured by a scale on the conveyer system or under a floor on which a worker may stand or walk that offsets the weight of the worker to determine package weight. Density may also be automatically measured by using X-ray, ultrasound, or other non-invasive sensor to determine how much space within a box of a package at the top and/or sides exist, contents of the package, or otherwise so that density may be used as a factor in constructing a virtual pallet stack.

At step 204, indications may be provided to operators to assist in constructing a physical pallet stack with the available packages based on the virtual pallet. The indications may be for guiding the operator to select the next package to be placed on the pallet and/or for informing the operator where or how to place a package. The indications may include the use of augmented reality (e.g., smart glasses or mobile app), visual indicators (e.g., lights or other projections), audible instructions (e.g., generated voice that states, "place box in the top right corner," "place box next to box number 2"), visual instructions in the form of text and/or graphics displayed on an electronic display that is positioned at the pallet, conveyer, or elsewhere, tones (e.g., Geiger Counter sounds that may be given to a worker via a headset or otherwise). In an embodiment, vibration or other tactile communication may be provided to a worker by causing a network connected mobile device (e.g., mobile computer, smart phone, smart watch, wearable device, etc.) to vibrate to get the attention of the worker when a problem occurs. In providing guidance to the workers, the guidance may be automatically determined and generated based on a virtual pallet stack that is automatically, semi-automatically, or manually created using the available packages and/or packages known to be soon available for inclusion in a pallet stack. It should be understood that indicators may be given in graphical form and/or human-readable form. For example, lights that include written characters, words, symbols, colors, and/or otherwise may be presented to the workers via light indicators from lights fixedly or temporarily positioned at a pallet or elsewhere to provide additional guidance information to help the workers avoid placing the packages at the wrong pallet or help ensure that the workers place the packages in the desired location. Other communications may be given to a worker as further described in co-pending provisional patent application having Ser. No. 62/666,526 filed on May 3, 2018, the contents of which are hereby incorporated by reference in their entirety.

At step 206, the process 200 may determine whether a package is properly placed in the stack on the pallet. In an embodiment, the system may use cameras or other sensing devices may determine that a package is missing from a virtual pallet, and guide the operator to find a next package for creating the actual pallet stack. For example, an indication may be provided (e.g., audible instruction, light projected on the package, augmented reality instruction, etc.) to inform the operator which package should be loaded next onto the pallet. If a user picks up an incorrect package, the system may recognize the incorrect package has been picked up (e.g., via computer vision of package location or dimensions, via barcode decoding, etc.) and inform the user of the mistake even prior to placement on the pallet stack. In an embodiment, the system may also identify that a package that was to be positioned on an actual pallet stack was not placed in a correct location or not placed timely at the correct location, and generate a notification to a worker who was handling or supposed to be handling the package, if such worker-package association knowledge is available. These operations may be performed on a real-time basis.

As discussed above, the system may also know what specific packages are placed on the pallet, as well as which packages from the virtual pallet have not yet been placed on the physical pallet stack. The system may make real-time determinations to reconfigure a pallet that is not stacked correctly. In an embodiment, if a determination is made that the pallet is incorrectly stacked, then a determination may be made as to whether mis-stacked package has to be repositioned or not (e.g., if the stack is within a particular tolerance of the original virtual design). For example, the system may recalculate the virtual pallet using the arrangement of packages currently known to be placed on the pallet along with the remaining packages yet to be placed on the pallet to arrive at an updated virtual pallet. If the system is able to create an updated virtual pallet that satisfies the acceptable predefined rules for pallet stacking, then the operator may be permitted to continue to stack the pallet without needing to correct the package placement that did not follow the prior instruction for the original virtual pallet. In some embodiments, the system may simply update the virtual pallet and proceed to guide/instruct the operator according to the updated virtual pallet. In some embodiments, the operator may be informed that an updated virtual pallet was created whereas in other embodiments, the system may simply make the appropriate changes without informing the operator as long as operator is not being required to make any corrections. This may provide the benefit of keeping the process moving without unnecessary delays as long as the finished stacked pallet meets the minimum threshold for the rules predefined for a pallet stack.

If a mis-stacked pallet does cause problems in recalculating an updated virtual pallet such that a minimum threshold for rules cannot be satisfied (e.g., bad weight distribution, dimension problems, not creating "T's" in the stacking based on knowing the dimensions and the placement of boxes below, etc.) then an alert or notification may be generated to force the workers to reconfigure the pallet in the correct way. The alert or notification may use any form of visual, audible, and/or tactile communication to the workers, as previously described.

The system may be configured to provide feedback (e.g., training, coaching, etc.) to assist the operator in the future even if a pallet does not need to be rebuilt. Feedback may include generating a report with suggestions for better technique in building the pallet based on analyzing the stacking approach taken by the operator compared with the optimized virtual pallet created by the system. In an embodiment, if the stack is built in a different way than determined by the virtual stack builder, then the system may determine whether the stack built by the workers was better (e.g., more efficient, shorter, better weight distribution, lower center of gravity, more centered center of gravity, or other metric), and use a learning system to further improve upon the virtual pallet stack building process.

If the verification at step 206 is that the package was placed in the correct location, then the process 200 may continue at step 208, where a determination may be made as to whether the stack is complete. If so, then the process may end at step 210. However, if it is determined that the stack is not complete, then the process may return to step 204, where the workers continue building the stack and the system may provide monitoring, guidance, and/or feedback to the workers during the process of constructing the pallet stack.

Otherwise, if a determination at step 206 is made that the package was not properly placed, then the system may provide feedback to the worker to correct the positioning of the package that was placed on the pallet stack, and the process may continue at step 212, where a determination may be made as to whether the worker corrected the error of the package placement. If the operator makes the correction, then the process may continue at step 208, where the determination as to whether the stack is complete is made. Otherwise, if the worker did not make the correction, then the process may continue to step 214, where the virtual pallet may be recalculated, as previously described. At step 216, a determination may be made as to whether the error was critical by determining whether any physical parameters that are or will result from the error will result in an unstable stack, package that will be crushed immediately or over time, contents of the package (or other packages) that could be damaged based on the positioning of the package, and so on. If no critical error was made, then the process may return to step 204. Otherwise, a notification or alert may be given to the workers (or a foreman) at step 218 and reconstruction of the stack may be performed, as previously described.

Foreign Object Detection

In addition to performing stack construction monitoring, the camera system may also be configured to detect foreign objects located on or near the pallet, such as scissors, knives, tape, etc. The foreign objects may be highlighted on a display screen or otherwise by the indicator system as described herein. In an embodiment, a light may be aimed at the foreign object and/or an audible notification may be issued locally at the pallet.

Conflict Resolution (Inter-Cell Overlap and Intra-Cell Overlap)

Figure 3:
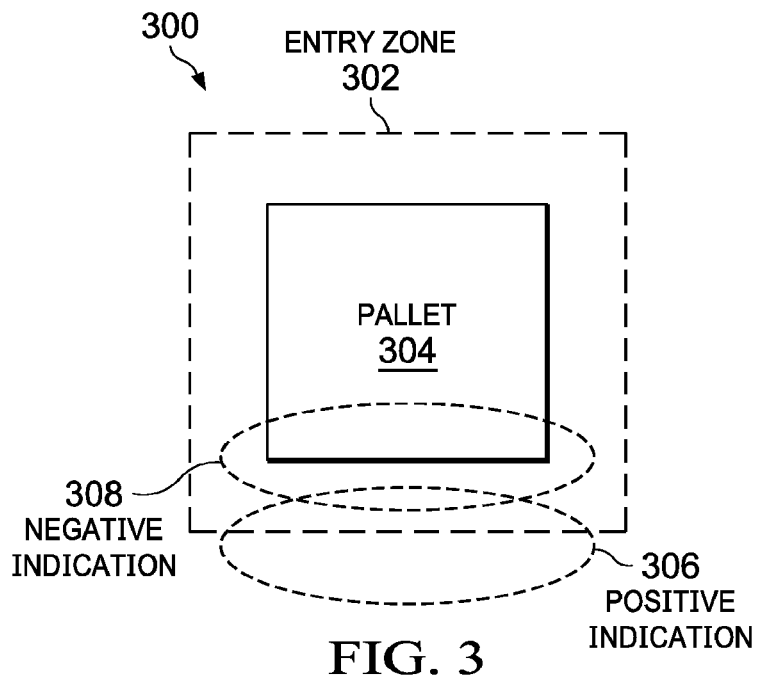
FIG. 3 is an illustration of an individual cell region in which a cell including camera(s), lighting, and processor(s) for monitoring and guiding operations at the cell region

With regard to FIG. 3, an illustration of an individual cell region 300 in which a cell including camera(s), lighting, and processor(s) for monitoring and guiding operations at the cell region is shown. The region cell 300 may include a virtual entry zone 302 surrounding a pallet 304 on which a pallet stack of packages (not shown) is being constructed. Two zones 306 and 308 are shown, where the first zone 306 is a region in which a positive indication is provided to workers who are delivering packages to the pallet 304, and the second zone 308 is a region in which a negative indication is provided to workers who are delivering packages to the pallet. It should be understood that the first and second zones 306 and 308 may be extended completely around the pallet 304 if workers are able to access the pallet 304 from any direction. The positive indication may be a green light or positive audible or other notification, and the negative indication may be a red light or negative audible or other notification, as further provided herein. As is further described herein with regard to FIG. 5, a conflict resolution may be communicated between neighboring cells that are closely located and/or for cameras within the cell itself where overlap may occur to view the package.

Light Indicators—Illumination

Light indicators, such as red and green colored lights, may be shown at different points at the pallet to account for motion of operator. During the process 200, for example, green may be shown at the first location as the operator enters a pallet area responsive to a successful decode and/or tracking of a worker to confirm that the worker and/or package is at the correct pallet location. A red color may be projected at a second location further into the pallet area. The recognition of an unsuccessful decode or determination that the pallet location is incorrect may take longer than the proper location. Thus, it may be helpful to have the red light be directed further into the pallet location where the person may be walking and more likely to not miss that indication. And, by projecting the red light farther into the pallet area, the system accommodates for inadvertent movements of the worker.

In a broader warehouse application, similar angled lights could be used at various checkpoints. Multicolor lights could be used with sensors determining the direction of motion of the operator to match red/green in either direction depending on the motion of the operator.

Light indicators may display multiple variations to pass more information to the operator. For example, color plus a specific pattern of flashing light may indicate instructions to the operator.

Light indicators may also be configured to direct the operator to the correct pallet. For example, the when the package is picked up at the conveyor, the package may be identified and the light indicators may be used to direct the operator to the correct pallet for that particular package. In one embodiment, each individual operator may have a specific light indication associated with him/her. As one example, person 1 may be assigned blue, person 2 may be assigned orange, person 3 may be assigned purple, and so on. When that operator picks up a package, the operator and the package may be associated with each other and the correct pallet for that package may be lit up with the color (or other indicator) associated with that particular operator to inform the operator where the correct pallet is located for that package. At the individual pallet level, the package placement at the pallet may again be checked for accuracy with feedback provided using lighted indicators (or other indicators), as desired. In an embodiment, a light or sequence of lights illuminated onto a pathway from the conveyer system to the correct pallet may be used to provide guidance to the worker. In one embodiment, such a path lighting feature may be used for workers who are just starting and are unfamiliar with the locations of the different pallets, thereby reducing or eliminating new hire learning curve.

Figure 4:
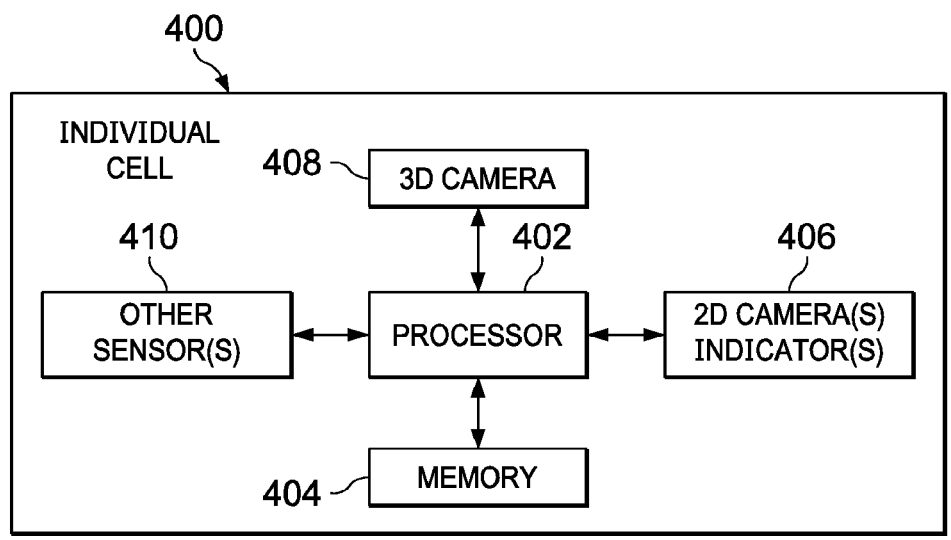
FIG. 4 is a block diagram of a cell system or cell that supports a cell region of FIG. 3.

With regard to FIG. 4, a block diagram of a cell system or cell 400 that supports a cell region 300 of FIG. 3 is shown. The system may include a processor 402 of a computing system that is in communication with a memory 404 for storing images, virtual pallet stacks, locations of pallets, information associated with packages, software, and any other information that is useful to managing and tracking packages within a distribution center or other facility. The cell system 400 may include one or more 2-dimensional (2D) camera 406, 3-dimensional (3D) camera 408, and one or more other sensors 410. The system 400 may be used for a single or multiple cells.

With regard to FIG. 5, an illustration of an environment 500 in which a pair of cells 502a and 502b (collectively 502) are adjacent to one another is shown. At each of the cells 502 are respective pallets 504a and 504b (collectively 504). Coordination between the cells 502 is not limited to just during times of movement along a grid of cells (i.e., when different pallets are being constructed within different cells in a grid of cell regions over time). Processors or other devices operating within neighboring cells may communicate with each other during pallet stacking at one or both of the cells 502. For example, if the pallets 504 are located closely together with a narrow passage therebetween, the fields-of-view 506a and 506b of the cameras (e.g., 2D and/or 3D) may at least partially overlap in an overlapping region 508 such that cameras and/or processors of both cells detect packages or other objects that are at the cells 502. For the purposes of this disclosure, association of processors between or amongst multiple cells is not necessarily one-to-one. For example, a processor may be configured to handle a set of several cells, or even all cells in an environment (see, for example, FIG. 7). Inter-cell communication may be a logical connection in software being executed by the processor(s) of the cells, such that a physical communication path between different processors is unnecessary.

To avoid confusion of multiple indicators being activated from neighboring cells to the same object, the processors of the cells 502 may communicate with each other (i.e., inter-cell communication) to determine a primary cell responsible for tracking the detected object. The determination may be based on proximity (e.g., which camera has the higher % of the object in its field-of-view 506a or 506b), information from the code scan, contents, direction of travel of the detected object, etc. Once it is determined which cell is selected to be the primary cell, the other cell may effectively ignore the object in its field-of-view 506a or 506b unless the operator changes course and another determination is to be performed.

Alternatively, the illumination system may be configured to give priority to positive indications over negative indications. For example, in the inter-cell overlap scenario shown in FIG. 5, the system may be configured to suppress a negative indication (e.g., red light) from the "wrong pallet" and enable the "correct pallet" to provide the positive indication (e.g., green light). This negative indication suppression may reduce the amount of simultaneous indications and make it easier for the user to understand where the package should go and reduce negative emotions of workers.

Moreover, the processor within each cell may be configured to resolve conflicts between cameras within a single cell. For example, in the event that an operator enters a pallet area diagonally (e.g., at a corner of the cell) as opposed to along a side, there may be substantial overlap in the fields-of-view of cameras on multiple sides such that cameras detect different part of the package and/or worker. One camera may view a barcode for decoding purposes, whereas another camera may have a majority of the package within its field-of-view. Thus, the camera from one side may be used to decode the barcode, whereas the light indicator of another side may show the result.

Using 3D Camera to Adjust Focus of Code Reading Cameras

A number of code reading devices may be reduced to cover a desired area if the output provided by a less expensive (or larger FOV/DOF) device is used as opposed to more expensive (or smaller FOV/DOF) devices.

At a single pallet, the 3D camera may be used to drive an adjustable focus code reading camera. The 3D camera information may detect the presence of a package and an associated depth, which may cause the code reading camera to adjust its focus to a corresponding depth to provide an accurate reading for smaller codes physically located farther away from the camera unit. As a result, the number of code reading cameras fixed at multiple depths-of-focus may be reduced.

At a warehouse level, an output of a 3D camera (or low-resolution 2D camera) may be detect regions-of-interest (e.g., presence of a person walking) to determine where to point and focus a movable or steerable higher resolution camera.

Hardware Environment

One or more overhead camera/lighting modules, such as in 62/666,526, may be distributed at locations throughout a warehouse. These may be strategically located along conveyor paths and pallet loading locations.

Figure 6:
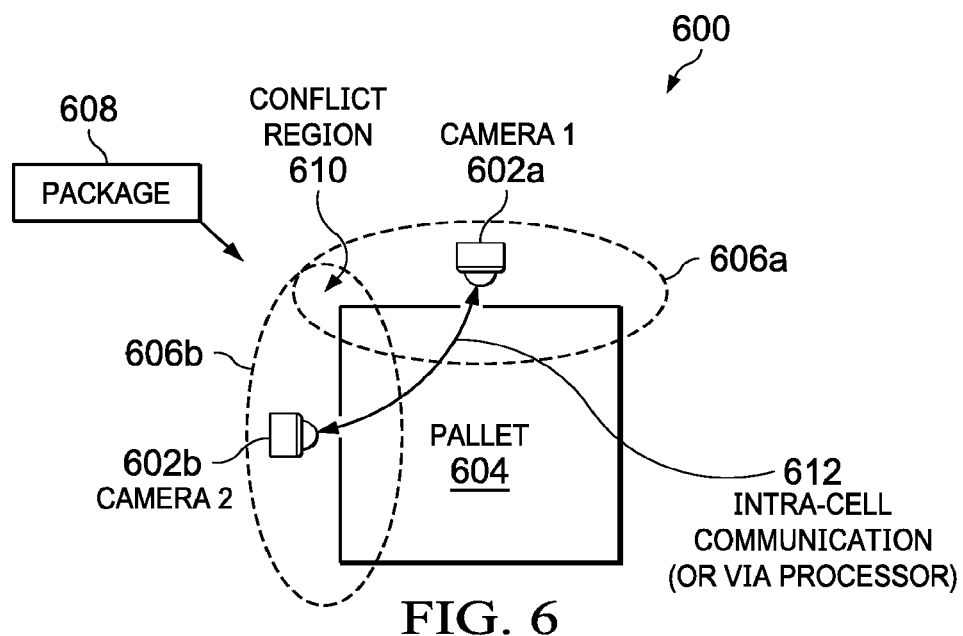
FIG. 6 is an illustration of an illustrative environment in which an overhead rail system (e.g., a grid system) may be constructed with camera and lighting modules that are able to move freely (e.g., automatically, semi-automatically, or manually) above the warehouse to locations where activity is occurring (e.g., new pallet stack being constructed)

With regard to FIG. 6, an illustration of an illustrative environment 600 in which an overhead rail system (e.g., a grid system) may be constructed with camera and lighting modules 602a and 602b (collectively 602) that are able to move freely (e.g., automatically, semi-automatically, or manually) above the warehouse to locations where activity is occurring (e.g., new pallet stack being constructed) is shown. It should be understood that more than two camera/lighting modules may be used for each cell including a pallet 604. The modules 602 may communicate with each other and/or be controlled by a traffic control unit to avoid collisions while moving. The camera/lighting modules 602 may be able to track operator and/or package movement to be used in multiple locations to reduce the number of fixed systems that need to be installed—especially useful where full capacity of the warehouse is rarely utilized. Instead of self-contained modules 602, individual subcomponents may move freely and independently above an overhead rail system to create a "module on the fly." That is, an individual camera may be moved independent of lighting or lights used for indications, as previously described. As shown, camera 602a may be capable of capturing images and/or moving within a region 606a and camera 602b may be capable of capturing images and/or moving within a region 606b. as a package 608 moves towards the pallet 604, the package moves through a conflict region 610, which may cause an intra-cell communication 612 between the camera modules 602 to perform conflict resolution, as previously described. Alternatively, a processor (not shown) being used to control monitoring and guidance at the cell may be used to resolve the conflict when the package 608 is within the conflict region 610 so that one of the camera modules 602 monitors and provide illumination guidance to the worker carrying the package 608, as previously described.

Figure 7:
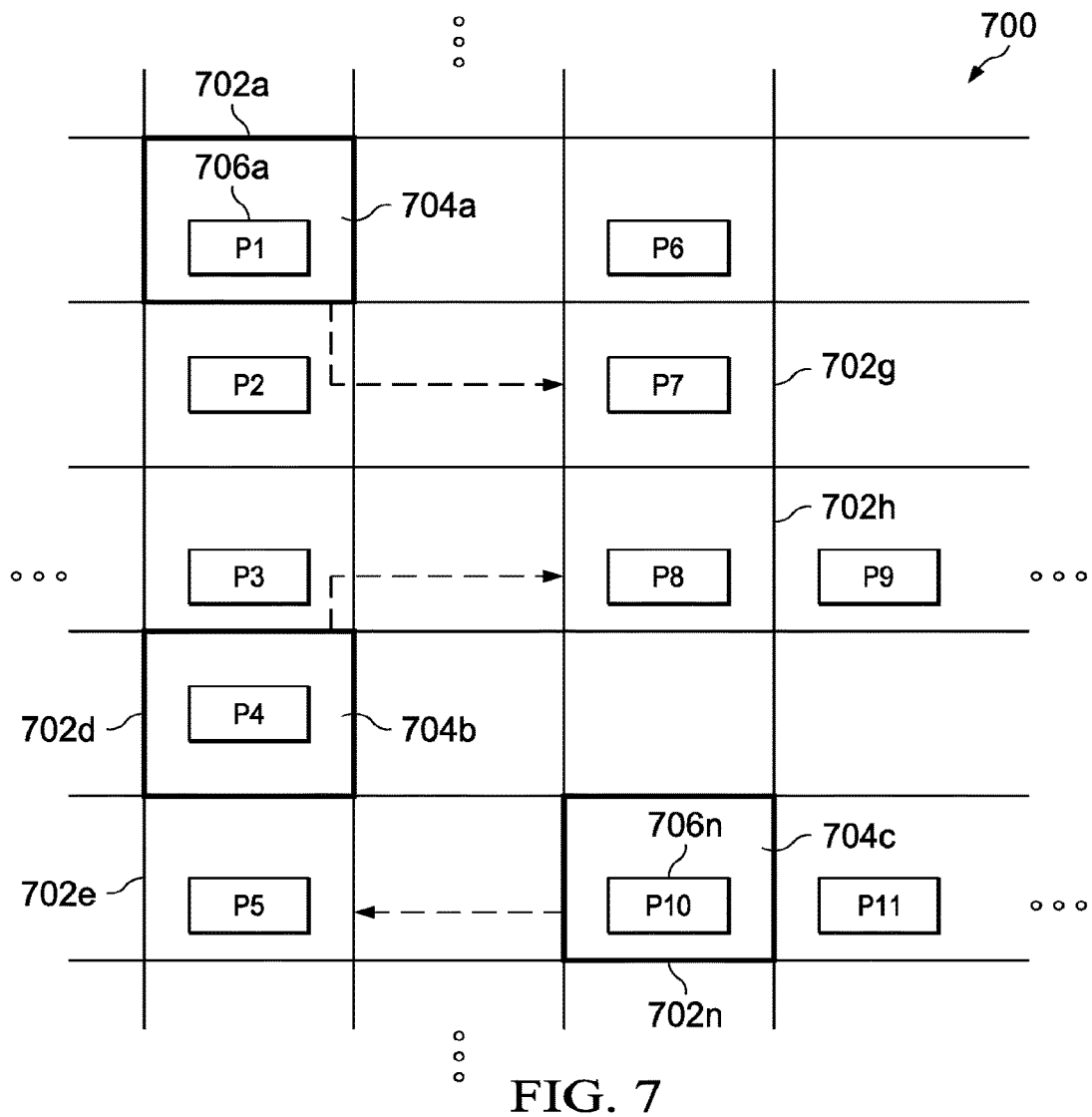
FIG. 7 is an illustration of an illustrative environment inclusive of a matrix of cell regions including three cells and pallets.

With regard to FIG. 7, an illustration of an illustrative environment 700 inclusive of a matrix of cell regions 702a-702n (collectively 702) including three cells 704a-704c (collectively 704) and pallets 706a-706n (collectively 706) is shown. The cells 704 may include modules (or certain individual components) that may be configured to control location of each of the cells 704. The cells may include electromechanical devices that allows for movement of the cells 704 to different cell regions 702. As shown cell 704a may move from cell region 702a to cell region 702g, cell 704b may move from cell region 702d to cell region 702h, and cell 704c may move from cell region 702n to cell region 702e. The movements may occur as the pallets 706 are being constructed, which may be based on a set schedule or non-set schedule. The movements may be performed automatically (e.g., in response to one pallet stack being completed and another identified to be starting to be stacked), semi-automatically (e.g., in response to a user commanding the cell to move), or manually (e.g., human moving the cell from one cell region to another).

Figure 8:
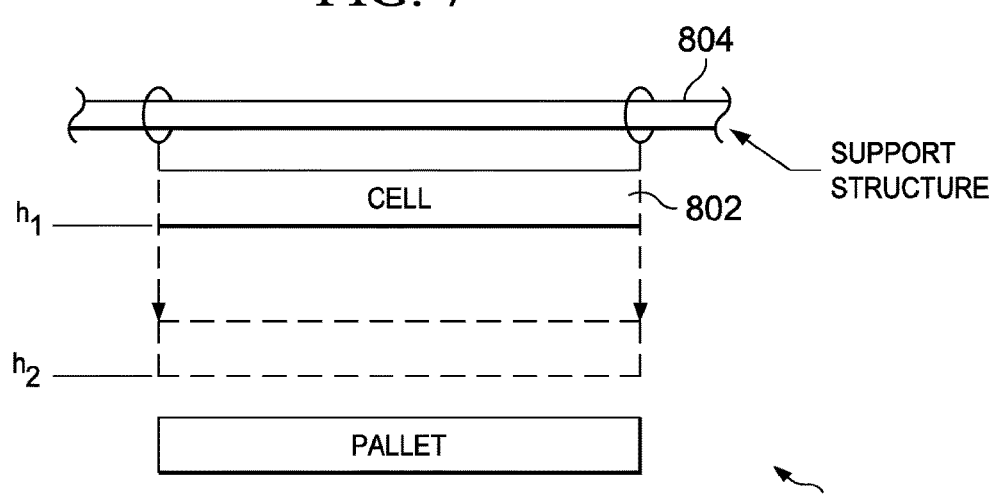
FIG. 8 is an illustration of an illustrative cell structure having a cell being supported by a support structure.

With regard to FIG. 8, an illustration of an illustrative cell structure 800 having a cell 802 being supported by a support structure 804 is shown. The support structure may enable support mechanisms 806a and 806b (collectively 806) to connect thereto or be supported thereby. In an embodiment, the support mechanisms may include wheels, tracks, and/or other trolley mechanism that enables the cell 802 to be moved from one cell region to another, as shown in FIG. 7. In addition, the support mechanisms 806a and 806b may include hoists, pulleys, or other dynamic mechanism that allows for control of height of the cell 802, so as to be lowered from a ceiling support structure 804 to a first height h2 when the lower levels of the pallet are being stacked and then being raised to a second height h1 as the pallet stack grows. Adjusting height of the cell 802 may provide better resolution at the lower levels of the pallet stack, which can then be raised to accommodate the growing pallet or other equipment (e.g., trolley). Positioning the height of the module may be responsive to manual user input and/or automatically based on the detected environment or pallet characteristics.

Angled lights for showing green or red so that red light is projected ahead of the direction of motion of the operator. Alternatively, lights are not angled, but offset at different locations along the axis of motion of the worker.

In an embodiment, a thermal camera may be configured to help distinguish workers from packages such as by combining image data of the thermal camera with image data from a 3D camera may help track operators throughout a warehouse and differentiate from packages that are picked up and carried from the conveyor system to a pallet as well as within a pallet cell.

For hardware of overhead or side-reading cameras, it would be very helpful to have dynamically zoomable lenses. The camera viewing-angle may be auto-toggling or adjusted based on information provided by 3D cameras or other sensors. The dynamically zoomable cameras may provide cost savings. For example, the use of dynamically zoomable lenses for a package/pallet reading-system, four cameras may be used instead of eight, probably with image-sensor resolution lower than 9MPix, thereby saving the cost of four cameras and associated mounting hardware, setup time, maintenance, cabling, communications, power usage, bandwidth, memory capacity, processing power, and so on.

The foregoing method descriptions and the process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A computer-implemented method for constructing a pallet stack, comprising:
   generating a virtual pallet stack using virtual packages having sizes and shapes corresponding with known available actual packages;
   in response to identifying an actual package to be placed on a pallet, providing an indication to a worker where the identified actual package is to be placed on the pallet stack based on the location of a corresponding virtual package on the virtual pallet stack;
   moving a cell including lights and cameras from a first cell region to a second cell region at which a first pallet stack and a second pallet stack are being successively constructed; and
   adjusting height of the cell as a function of a height of the pallet stack increasing.

2. The method according to claim 1, wherein providing an indication includes illuminating a location on the pallet stack with a light beam.

3. The method according to claim 1, further comprising:
   sensing an actual location that the worker placed the actual package on the pallet stack; and
   in response to determining that the actual location was incorrect, generating a feedback signal indicative of the actual package being placed in an incorrect location, otherwise, either not generating the feedback signal or generating a feedback signal indicative of the actual package being placed in the correct location on the pallet stack.

4. The method according to claim 3, further comprising:
   in response to determining that the actual package was placed in an incorrect location on the pallet stack, determining whether the worker corrected the placement location of the actual package on the pallet stack; and
   in response to determining that the worker did not correct the location of the actual package, determining whether the location of the actual package on the pallet stack does not meet a minimum requirement for predefined rules of the system;
   if a determination is made that the location of the placement of the actual package on the pallets stack does not meet the minimum requirement, then communicating another notification to the worker to correct the location of the actual package on the pallet stack, otherwise, not communicating another notification to the worker.

5. The method according to claim 4, further comprising, in response to determining that the pallets that does meet the minimum requirement:
   generating an updated virtual pallet stack with a corresponding virtual package of the incorrectly placed actual package placed in a corresponding location on the virtual pallet stack; and
   using the updated virtual pallet stack for future guidance in constructing the pallet stack.

6. The method according to claim 1, further comprising:
   generating a first notification signal for the worker at a first distance from a second pallet stack, the first notification signal be indicative of the actual package being delivered to the second pallet stack being correct; and
   generating a second notification signal for the worker at a second distance that is closer to the second pallet stack then the first distance, the second notification signal being indicative that the second pallet stack is incorrect for the actual package to be placed.

7. The method according to claim 1, further comprising in response to (i) a first cell used to monitor packages been delivered to the pallet stack determining that the actual package is in a field-of-view of a first camera, and (ii) a second cell used to monitor packages being delivered to the another pallet stack determining that the actual package is in a field-of-view of a second camera, communicating a signal between a processor of the first cell and a processor of the second cell to coordinate which of the cells is to provide feedback to the worker.

8. The method according to claim 7, wherein the communication includes a command for a processor of the first or second cell at which the actual package is supposed to be delivered based on the pallet stack for the actual package to be placed.

9. A pallet management system, comprising:
   a first cell including a camera system configured to monitor and identify packages within its field of view and provide feedback to an operator for stacking packages on a pallet;
   a second cell including a camera system configured to monitor and identify packages within its field of view and provide feedback to an operator for stacking packages on a pallet; and
   at least one processor operably coupled with the first and second cells, the at least one processor configured to control movement of at least one of the first cell or the second cell, wherein the first cell and the second cell are configured to move about an overhead rail system.

10. The pallet management system of claim 9, wherein the first cell and the second cell are configured to move about an overhead rail system from a first location to a second location automatically responsive to the pallet management system determining pallet stack being completed at the first location in anticipation of a pallet stack being initiated at the second location.

11. The pallet management system of claim 10, wherein each of the first cell and the second cell include subcomponents that are independently controllable and configurable to move to be reconfigured in a different cell on the fly.

12. The pallet management system of claim 9, wherein at least one of the first cell or the second cell is configured to provide guidance and feedback to the operator for stacking packages on the pallet based on a virtual pallet stack being generated.

13. The pallet management system of claim 9, wherein the overhead rail system is arranged as a grid system.

14. The pallet management system of claim 9, wherein movement of the at least one of the first cell or the second cell occurs automatically based on a set schedule.

15. The pallet management system of claim 9, wherein movement of the at least one of the first cell or the second cell occurs automatically responsive to at least one of a pallet stack being completed or another pallet stack beginning to be stacked.

16. A pallet management system comprising:
- a first cell including a camera system configured to monitor and identify packages within its field of view and provide feedback to an operator for stacking packages on a pallet;
- a second cell including a camera system configured to monitor and identify packages within its field of view and provide feedback to an operator for stacking packages on a pallet; and
- at least one processor operably coupled with the first and second cells, the at least one processor configured to control movement of at least one of the first cell or the second cell, wherein each of the first cell and the second cell are configured to communicate with each other via inter-cell communication.

17. The pallet management system of claim 16, wherein the intra-cell communication includes resolving conflicts between the first cell and the second cell to determine which cell is the primary cell responsible for imaging and illumination.

18. The pallet management system of claim 17, wherein the pallet management system is configured to determine which cell is the primary cell responsible for imaging and illumination based on at least one of proximity, information from a code scan, contents of the detected package, direction of travel of the package, or any combination thereof.

19. The pallet management system of claim 17, wherein the cell that is not determined to be the primary cell is configured to ignore the corresponding package while in its field of view.

20. A pallet management system comprising:
- a first cell including a camera system configured to monitor and identify packages within its field of view and provide feedback to an operator for stacking packages on a pallet;
- a second cell including a camera system configured to monitor and identify packages within its field of view and provide feedback to an operator for stacking packages on a pallet; and
- at least one processor operably coupled with the first and second cells, the at least one processor configured to control movement of at least one of the first cell or the second cell, wherein sub-components of each of the first cell and the second cell are configured to communicate with each other within their respective cell via intra-cell communication to resolve conflicts therein.

* * * * *